United States Patent
Florence et al.

(10) Patent No.: US 11,190,644 B2
(45) Date of Patent: Nov. 30, 2021

(54) IN-CALL MESSAGING FOR INACTIVE PARTY

(71) Applicant: International Business Machines Corporation, Armonk, NY (US)

(72) Inventors: Christopher Robert Florence, Raleigh, NC (US); Wisam Mohammed, San Jose, CA (US); Glenn Edward Reschke, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/663,005

(22) Filed: Oct. 24, 2019

(65) Prior Publication Data

US 2021/0127013 A1 Apr. 29, 2021

(51) Int. Cl.
H04M 3/533 (2006.01)
H04M 3/436 (2006.01)
H04M 1/65 (2006.01)
H04M 3/54 (2006.01)
H04M 3/537 (2006.01)
H04M 3/42 (2006.01)

(52) U.S. Cl.
CPC ......... *H04M 3/533* (2013.01); *H04M 1/6505* (2013.01); *H04M 3/42042* (2013.01); *H04M 3/42059* (2013.01); *H04M 3/436* (2013.01); *H04M 3/537* (2013.01); *H04M 3/54* (2013.01)

(58) Field of Classification Search
CPC ....................................................... H04W 4/12
USPC ....................................................... 455/413
See application file for complete search history.

(56) References Cited

U.S. PATENT DOCUMENTS

| | | | |
|---|---|---|---|
| 6,661,886 B1 | 12/2003 | Huart et al. | |
| 7,848,506 B1 * | 12/2010 | Infosino | H04M 3/436 379/215.01 |
| 8,081,748 B2 | 12/2011 | Johns | |
| 8,489,080 B1 | 7/2013 | Breau et al. | |
| 2003/0169865 A1 | 9/2003 | Oren | |
| 2004/0264653 A1 * | 12/2004 | Revisky | H04M 1/663 379/88.12 |
| 2005/0147227 A1 * | 7/2005 | Chervirala | H04M 3/4286 379/215.01 |
| 2005/0157864 A1 | 7/2005 | Barclay et al. | |
| 2008/0181373 A1 * | 7/2008 | Brown, Jr. | H04M 3/54 379/88.13 |
| 2009/0010415 A1 * | 1/2009 | Ustby | H04M 3/428 379/215.01 |
| 2009/0154669 A1 | 6/2009 | Wood et al. | |
| 2009/0207992 A1 * | 8/2009 | Burg | H04M 3/4285 379/215.01 |

(Continued)

*Primary Examiner* — Charles N Appiah
*Assistant Examiner* — Frank E Donado
(74) *Attorney, Agent, or Firm* — Kelli D. Morin (57) ABSTRACT

A method for using a system which enables a party to provide an in-call message to another party in an ongoing call includes receiving a first signal indicating that a first party in a call is inactive. The method further includes indicating to a second party in the call that the first party in the call is inactive. The method further includes receiving a recorded message from the second party in the call. The method further includes receiving a second signal indicating that the first party in the call is active. The method further includes providing, in response to receiving the second signal, the recorded message to the first party.

20 Claims, 3 Drawing Sheets

(56) References Cited

U.S. PATENT DOCUMENTS

| | | | | |
|---|---|---|---|---|
| 2010/0150323 A1* | 6/2010 | Grattan | ............... | H04M 3/4286 379/88.18 |
| 2010/0266113 A1* | 10/2010 | Hartley | ............... | H04M 3/5231 379/207.04 |
| 2015/0332708 A1* | 11/2015 | Keller | ................. | H04M 3/4285 704/270 |
| 2017/0213452 A1* | 7/2017 | Brunolli | .............. | G06F 3/04883 |

* cited by examiner

IN-CALL MESSAGING FOR INACTIVE PARTY

BACKGROUND

The present disclosure relates generally to the field of telecommunications, and more particularly to enabling a party to provide an in-call message to another party in an ongoing call.

SUMMARY

Embodiments of the present disclosure include a method, computer program product, and system for enabling a party to provide an in-call message to another party in an ongoing call. The method includes receiving a first signal indicating that a first party in the call is inactive. The method further includes indicating to a second party in the call that the first party in the call is inactive. The method further includes receiving a recorded message from the second party in the call. The method further includes receiving a second signal indicating that the first party in the call is active. The method further includes providing, in response to receiving the second signal, the recorded message to the first party.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of telecommunications, and in particular to enabling a party to provide an in-call message to another party in an ongoing call. While the present disclosure is not necessarily limited to such applications, various aspects of the disclosure may be appreciated through a discussion of various examples using this context.

A telephone call traditionally refers to an audio connection over a telephone network between a calling party and a called party. Today, the term "telephone call" or "call" has a broader definition that can also refer to a connection over the internet, a video connection, and/or a connection between more than two parties simultaneously. Once a connection has been made between parties in a call, a party may be "active" in the call, meaning their connection to the other party or parties in the call is in use, or "inactive," meaning their connection to the other party or parties in the call is not in use, but that the call has not become disconnected (e.g., no party to the call has hung up). A party may be inactive in the call by suspending the call without disconnecting the call, for example, by placing the other party or parties in the call on-hold and/or in a queue.

It is common for a party of a telephone or conference call to have to wait on hold during the call while another party is inactive in the call. For example, if a caller places a call to order a product or service, or for assistance or support in using a product or service, the caller may have to wait in a queue for a service representative to be available to provide assistance. In some instances, a caller may be placed on hold while the service provider answers another incoming call. Additionally, it is possible that during such a call, the service representative may need to be inactive in the call for a period of time to perform certain actions or gather information. There are a number of other common scenarios in which a caller may be placed on hold and/or in a queue during a call and spend time waiting for the other party to return to the call. A party who is placed on hold and/or in a queue may be described as waiting in an ongoing call for an inactive party to return to the call.

If, for some reason, a waiting party who is waiting in an ongoing call for an inactive party to return to the call has to be inactive in the call for a period of time, it is undesirable for the waiting party to have to leave the call, as this will result in the call being disconnected. By disconnecting the call, the waiting party may be forced to lose their place in the queue or abandon an ongoing task. It is also undesirable for the waiting party to simply walk away from the call while remaining active in the call, as this may result in confusion when the inactive party does return to the call but finds no one to speak to.

Accordingly, it is desirable for a waiting party to be able to become inactive in a call while keeping the call connected. This would enable the waiting party to retain a place in a queue despite having to temporarily step away from the call. Such a system would enable improved communication between parties in a call and reduce frustrations related to waiting for an inactive party to return to a call.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
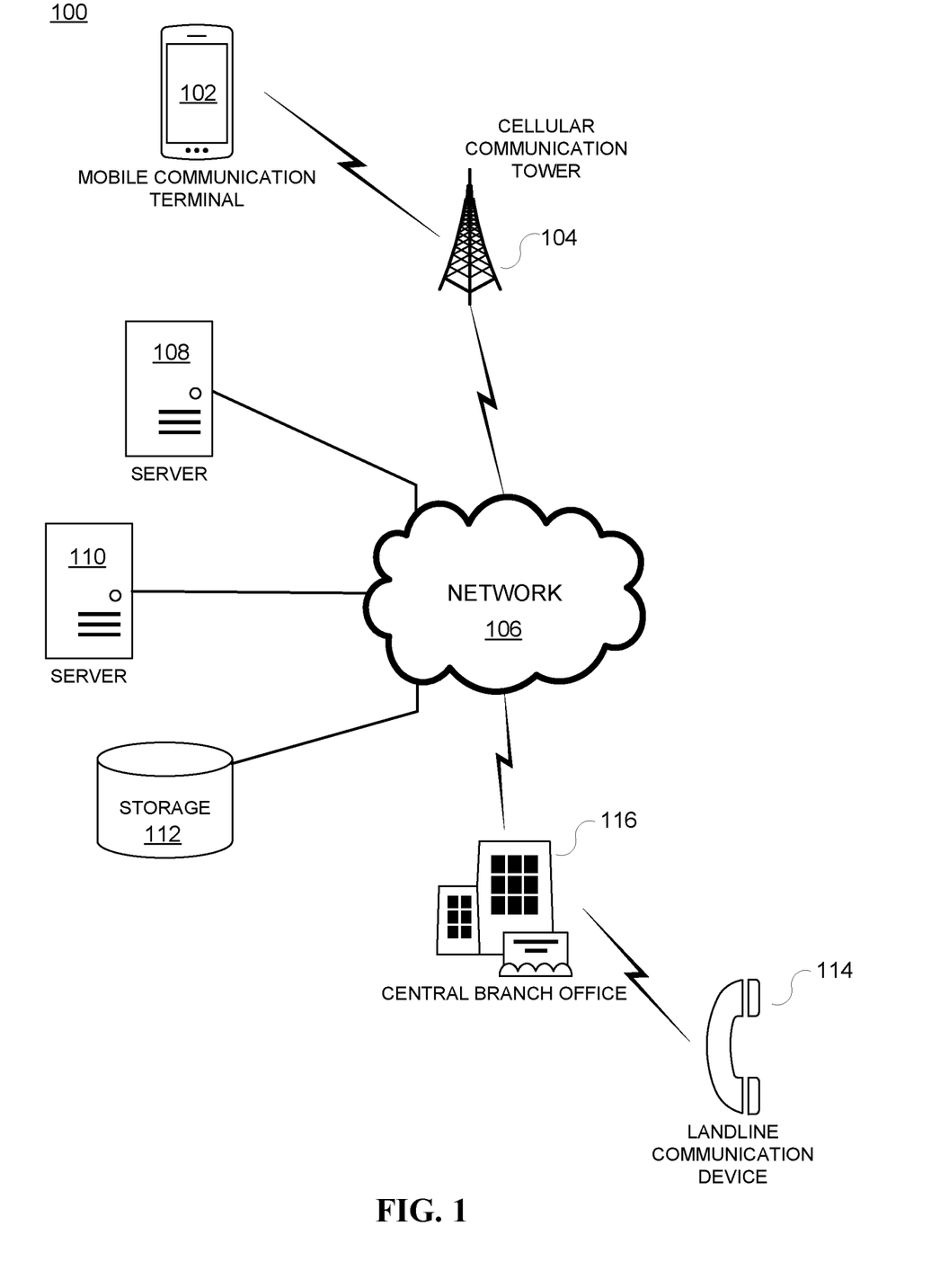
FIG. 1 illustrates a schematic drawing of a telecommunication network, in accordance with embodiments of the present disclosure.

With reference now to the Figures, FIG. 1 is a pictorial representation of a telecommunication network 100 in which illustrative embodiments may be implemented. Telecommunication network 100 may be a network of computers, mobile communication terminals, landline communication devices, cellular communication towers, central branch offices, and other data processing devices in which the illustrative embodiments may be implemented. Telecommunication network 100 contains network 106, which is the medium used to provide communications links between the computers, mobile communication terminals, landline communication devices, cellular communication towers, central branch offices, and the other data processing devices connected together within telecommunication network 100. Network 106 may include connections such as, for example, wired communication links, wireless communication links, and fiber optic cables.

In the depicted example, first server 108 and second server 110 connect to network 106, along with storage 112. First server 108 and second server 110 may be, for example, server computers with high-speed connections to network 106. In addition, first server 108 and second server 110 may provide a set of one or more services to client devices connected to network 106. For example, first server 108 and second server 110 may be receivers that provide one or more telecommunication system services, such as holding, call-waiting, voicemail, and/or messaging services, to the client devices connected to the network 106. The first and second servers 108, 110 may be configured to perform the method(s) (or one or more operations of the method(s)) described herein, including the method 200.

Mobile communication terminal 102 and landline communication device 114 also connect to network 106 via cellular communication tower 104 and central branch office 116, respectively. It should be noted that mobile communication terminal 102, landline communication device 114, cellular communication tower 104, and central branch office 116 represent any number of (e.g., a plurality of) mobile communication terminals, landline communication devices, cellular communication towers, and central branch offices connected to network 106. Mobile communication terminal 102 and landline communication device 114 are clients of first server 108 and second server 110. In the depicted example, first server 108 and second server 110 may provide information, such as boot files, operating system images, and applications to mobile communication terminal 102 and landline communication device 114. First server 108 and second server 110 may also provide voicemail services to mobile communication terminal 102 and landline communication device 114.

Mobile communication terminal 102 may be, for example, a smart phone, a cellular telephone, a desktop computer, a laptop computer, a handheld computer, a tablet, a personal digital assistant, or a gaming device with wireless communication links to network 106. Landline communication device 114 may be, for example, a standard handset telephone, a cordless handset telephone, or a desktop computer. It should be noted that mobile communication terminal 102 and landline communication device 114 may represent any combination of different mobile communication terminals and landline communication devices connected to network 106.

Cellular communication tower 104 may wirelessly connect to network 106. Cellular communication tower 104 is a fixed-location transceiver that wirelessly communicates directly with mobile communication terminal 102. Cellular communication tower 104 serves a cell within the telecommunication system. Typically, a mobile communication terminal connects with the nearest available cellular communication tower. A mobile communication terminal makes and receives calls through the cellular communication tower that the mobile communication terminal is currently connected to within a cell. A mobile communication terminal is able to move from cell to cell during an ongoing continuous communication by one cellular communication tower in one cell handing off or handing over the mobile communication terminal to another cellular communication tower in another cell.

Central branch office 116 connects to network 106 using wired connections. Central branch office 116 is a fixed-location telephone exchange or central office telephone switch used to connect and route telephone calls in a public switched telephone network (PSTN). Multiple telephone switches capable of handling hundreds of thousands of telephone calls per hour may be housed within central branch office 116. Landline communication device 114 connects to central branch office 116 via wire connections.

Storage 112 is a network storage device capable of storing data in a structured format or unstructured format. Storage 112 may provide storage of a plurality of different user names and associated identification numbers, user profiles, and user account information associated with the telecommunication system. Further, storage 112 may store other data, such as authentication or credential data that may include user names, passwords, and biometric data associated with each of the plurality of users or system administrators. Additionally, storage 112 may store holding, call-waiting, voicemail, and/or messaging information, such as a call's position in a holding queue, projected wait time for a call in a holding queue, one or more recorded messages, a battery state, and/or received messages, associated with each of the plurality of users or system administrators in a subscriber account. It should be noted that storage unit 112 may include any data that may be utilized by the telecommunication system.

Also, it should be noted that telecommunication network 100 may include any number of additional server devices, mobile communication terminals, landline communication devices, cellular communication towers, central branch offices, storage devices, and other devices not shown. Program code located in telecommunication network 100 may be stored on a computer readable storage medium and downloaded to a computer or other data processing device for use. For example, program code may be stored on a computer readable storage medium on first server 108.

In the depicted example, telecommunication network 100 may be implemented as a number of different types of telecommunication networks, such as, for example, an internet (e.g., in the case of a Voice over IP (VoIP) system), an intranet, a local area network (LAN), and a wide area network (WAN). FIG. 1 is intended as an example, and not as an architectural limitation for the different illustrative embodiments.

Figure 2:
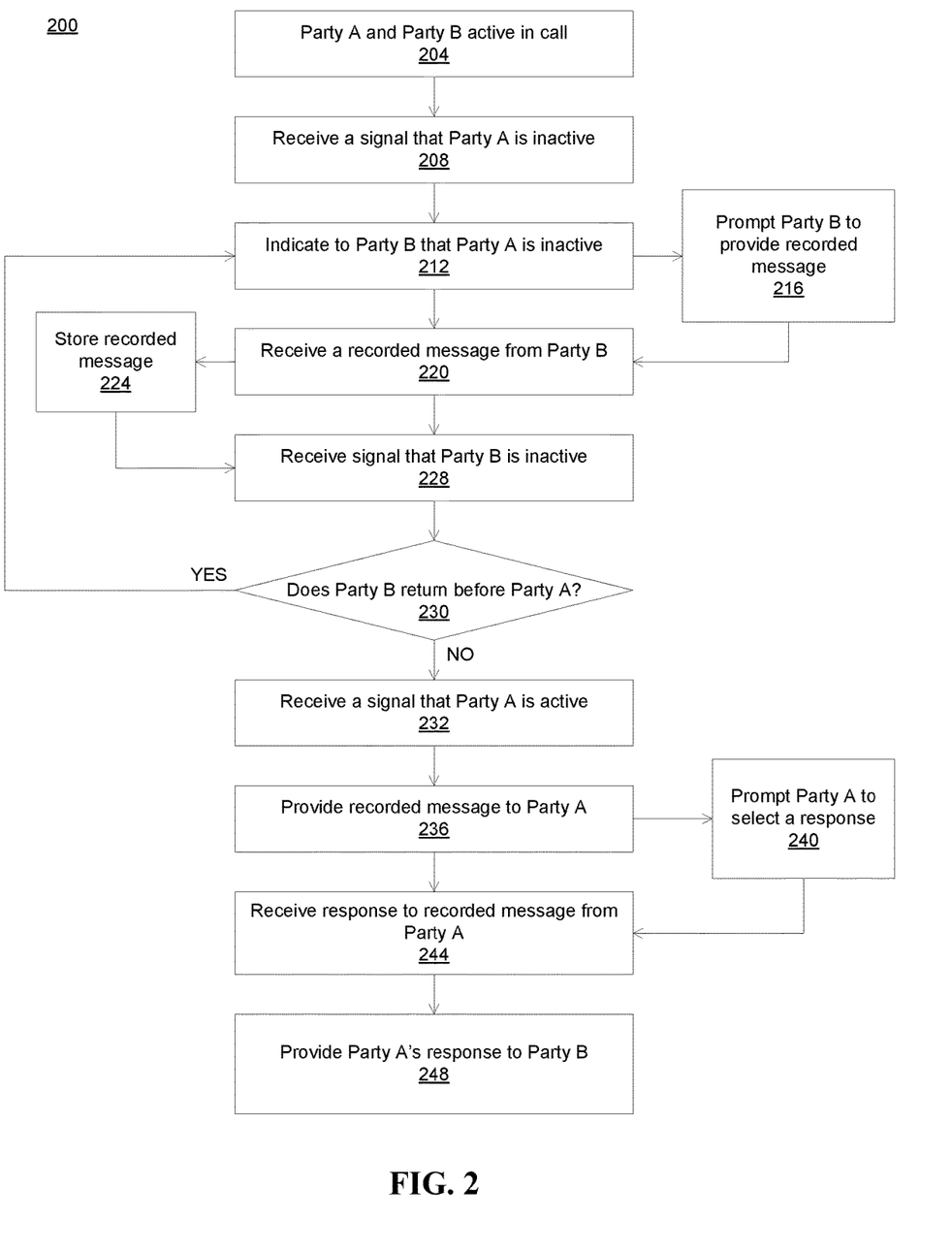
FIG. 2 illustrates a flowchart of an example method for using a system which enables a party to provide an in-call message to another party in an ongoing call, in accordance with embodiments of the present disclosure.

Referring now to FIG. 2, shown is a flowchart of an example method 200 for using a system which enables a party to provide an in-call message to another party in an ongoing call, in accordance with embodiments of the present disclosure. In the method 200, for example, a calling party may be represented by mobile communication terminal 102 (FIG. 1), and a called party may be represented by landline communication device 114 (FIG. 1). The called party may be referred to in this example as "Party A," and the calling party may be referred to in this example as "Party B." This example is intended to be for illustrative purposes only, and is not intended to be limiting.

The method 200 may be performed using a telecommunications system. In some embodiments of the present disclosure, the system may be substantially similar to the telecommunications network 100 shown in FIG. 1. In alternative embodiments of the present disclosure, the system may be an application (or "app") available on one or more of the parties' devices. In such embodiments, at a minimum, one of Party A and Party B would run the application in the call to enable sending and receiving signals, receiving and providing a recorded message, storing the recorded message, and/or prompting the parties.

The example method 200 begins at operation 204, in which Party A and Party B are connected in a call. The calling party, Party B, may have placed the call to the called party, Party A, to schedule an appointment, for example. When Party A receives the call and is connected to Party B, Party A and Party B are both active in the call.

In some instances, an incoming call may be initially received or acknowledged by an automated call receiver that places incoming calls in a queue to wait for an available representative. In such instances, the automated call receiver initially represents Party A, and the available representative subsequently represents Party A. Such automated call receivers typically indicate to a caller that their call is being placed in a queue and may provide a caller with a prerecorded message or a menu of options. In such instances, after the call is received or acknowledged by the automated call receiver and before the call is placed in a queue, Parties A and B are both active in the call.

At operation 208, the system receives a signal indicating that Party A has become inactive in the call. This may occur if, for example, Party A has placed Party B on hold to answer another incoming call or to communicate with a third party regarding scheduling of an appointment. Alternatively, in instances of an automated call receiver, this may occur when Party B is placed in the queue. In other words, the signal received at operation 208 may indicate to the system that the call has been placed in a queue.

At operation 212, the system indicates to Party B that Party A is inactive. For example, the system may provide a standard recorded message to Party B to communicate that Party A has temporarily left the call and will return to the call. In some instances, Party A will have provided a verbal indication to Party B of the intention to temporarily leave the call, in which case operation 212 may be superfluous. However, it may still be helpful to clarify to Party B that Party A has temporarily left the call and will return to the call.

In some embodiments of the present disclosure, the method 200 then proceeds with operation 216, wherein the system prompts Party B to provide a recorded message. For example, the system may indicate a projected wait time for Party A to return to the call and then may ask if Party B would like to leave a recorded message for Party A. If the projected wait time is greater than an amount of time that Party B is willing or able to remain active in the call, Party B may choose to leave a recorded message for Party A rather than remaining active in the call until Party A returns to the call. In some embodiments of the present disclosure, for example, Party B may indicate to the system the choice to leave a recorded message for Party A by speaking a word or phrase or pressing a key that is programmed to indicate to the system that Party B will leave a recorded message.

In some embodiments of the present disclosure, the system may prompt Party B to leave a recorded message for Party A only once. In some such embodiments, the system may prompt Party B immediately after receiving the signal that Party A is inactive. Accordingly, in such embodiments, operation 216 may be considered part of operation 212. In some alternative embodiments, the system may prompt Party B after a certain amount of time has elapsed since receiving the signal that Party A is inactive. Accordingly, in such embodiments, if Party A returns prior to the certain amount of time, then Party B is not prompted to leave a recorded message for Party A.

In some alternative embodiments of the present disclosure, the system may prompt Party B to leave a recorded message for Party A repeatedly. In some such embodiments, the system may prompt Party B at regular intervals after receiving the signal that Party A is inactive. Accordingly, in such embodiments, Party B may initially choose to wait for Party A to return rather than to leave a recorded message and then has the option to later choose to leave a recorded message for Party A.

In some alternative embodiments, method 200 may proceed without operation 216. In such embodiments, the system does not prompt Party B to leave a recorded message for Party A. Instead, Party B is able to independently decide to leave a recorded message for Party A. To indicate that it is optional, operation 216 is shown with dashed lines in FIG. 2.

In either case, at operation 220, the system receives a recorded message from Party B for Party A. Party B may choose to leave a recorded message for Party A if Party B needs or wants to be inactive in the call prior to the return of Party A. For example, if Party B needs to answer the door or interact with another person prior to the return of Party A, then Party B may choose to leave a recorded message for Party A that indicates to Party A that Party B has temporarily left the call and will return to the call. In such embodiments, Party B may indicate the spontaneous choice to leave a recorded message for Party A by speaking a word or phrase or pressing a key that is programmed to indicate to the system that Party B will leave a recorded message.

In some embodiments of the present disclosure, the recorded message may be a video message, an audio message, or a text message. In some embodiments of the present disclosure, the system may prompt or Party B may choose to leave a new recorded message. In some alternative embodiments of the present disclosure, the system may prompt or Party B may choose to select one of a number of prepared messages. Such prepared messages could have been previously prepared by Party B or may be standard options provided by the system. In some embodiments, the recorded message may include an indication of how long Party B expects to be away from or unavailable for the call.

Additionally, or alternatively, as part of providing the recorded message, Party B may indicate if and/or how he would like to be informed of the return of Party A to the call. For example, if Party B goes to answer the door, he may indicate that he would like his phone to ring when Party A returns to the call. This would enable Party B to decide whether to return to the call, if possible, when he is made aware that Party A has returned to the call and is active in the call again.

In embodiments wherein Party B leaves a new recorded message, the method 200 may proceed with operation 224, wherein the system stores the recorded message. In embodiments wherein Party B selects a previously prepared message, the system does not necessarily need to store the message.

In either case, after receiving and/or storing the recorded message from Party B, at operation 228, the system receives a signal that Party B has become inactive in the call. Put another way, this signal indicates that Party B has put an on-hold call on hold or is otherwise not available to communicate with Party A (e.g., has stepped away). In some embodiments, receipt of the recorded message from Party B may act as the signal that indicates that Party B has become inactive. Once the system has received the signal that Party B is inactive, the system is holding the connections of both inactive Parties.

As indicated at operation 230, it is possible that Party B may return to the call before Party A returns to the call. If Party B returns to the first, then Party B merely returns to the same situation that he left. In such instances, the system may provide an indication to Party B that nothing has changed in the call between when he left and when he returned. Additionally, or alternatively, in such instances, the system may return to operation 212 of the method 200. In some embodiments, the message left by Party B may be deleted in response to Party B returning to the call before Party A returns.

Alternatively, if Party B does not return to the call before Party A returns to the call, then, necessarily, Party A returns to the call first. In such instances, the system may proceed with operation 232 of the method 200, wherein the system receives a signal indicating that Party A has returned and is active in the call again. In some embodiments, the signal received at operation 232 may indicate to the system that Party B's call has reached a first position in the queue, or that Party A has been taken off hold. As used herein, the call in the first position in the queue is the call which Party A picks up, or becomes active in. In some embodiments, the system may determine that Party A has returned to the call in response to detecting that Party A is attempting to speak to Party B, or in response to Party A requesting to listen to Party B's recorded message. Upon receiving this signal, the system performs operation 236 of the method 200 and provides the recorded message to Party A.

In some embodiments of the present disclosure, the method 200 then proceeds with operation 240, wherein the system prompts Party A to select a response to the recorded message. For example, if the recorded message received by Party A indicates that Party B has gone to answer the door and expects to return in five minutes from the time the message was provided by Party B, then Party A may select a different response than if the recorded message indicates that Party B has taken another phone call and does not have an expected time to return to the call.

The system may provide a number of standard response options for Party A to choose from. For example, one possible response option that may be available to Party A is to remain active in the call until Party B returns to the call. Another possible response option that may be available to Party A is to return the call to a queue, possibly in a secondary queue which is checked more often, or at a position near the front of a queue, so that Party A can place Party B's call back on hold, rather than waiting, while Party B is inactive. Party A may also select a response option that causes the system to alert Party A (e.g., via a text message, by ringing the phone) when Party B returns. In some embodiments of the present disclosure, the response may include providing another recorded message, from Party A to Party B, in response to the recorded message received from Party B. In such embodiments, the recorded message left by Party A may be a video message, an audio message, or a text message.

In some embodiments of the present disclosure, the system may prompt Party A to provide a response to the recorded message from Party B only once. In some such embodiments, the system may prompt Party A immediately after providing the recorded message from Party B to Party A. Accordingly, in such embodiments, operation 240 may be considered part of operation 236. In some alternative embodiments, the system may prompt Party A after a certain amount of time has elapsed since providing the recorded message from Party B to Party A.

In some alternative embodiments of the present disclosure, the system may prompt Party A to provide a response to the recorded message from Party B repeatedly. In some such embodiments, the system may prompt Party A at regular intervals after providing the recorded message from Party B to Party A. Accordingly, in such embodiments, Party A may initially choose to wait for Party B to return rather than to provide a response and then has the option to later choose to provide a response to Party B.

In some alternative embodiments, method 200 may proceed without operation 240. In such embodiments, the system does not prompt Party A to provide a response to Party B. Instead, Party A is able to independently decide to provide a response to Party B. In such embodiments, Party A may indicate the spontaneous choice to provide a response to Party B by speaking a word or phrase or pressing a key that is programmed to indicate to the system that Party A will provide a response. In either case, at operation 244, the system receives a response from Party A to Party B. In other words, at operation 244, the system receives the response provided by Party A to Party B in response to the recorded message provided by Party B to Party A.

At operation 248, Party B returns to the call, and the system provides Party A's response to Party B. In instances wherein Party A's response was to remain active and wait in the call for Party B to return, at operation 248, the system reconnects the active Parties. In instances wherein Party A's response was to place Party B in a queue, at operation 248, the system indicates to Party B that Party B is in a queue. In some embodiments, the system may indicate Party B's position or estimated wait time in the queue. In instances wherein Party A's response was to provide a recorded message to Party B, at operation 248, the system provides the recorded message to Party B.

In some embodiments of the present disclosure, the system may provide a menu to the Parties for leaving and/or receiving in-call messages. The menu may be, for example, an audio menu with push-button responses. Additionally, or alternatively, the menu may be a graphical menu provided via a graphical user interface on a screen of a mobile phone.

In some embodiments, one or more of the operations of the method 200 described herein may be performed in alternative orders or may not be performed at all; furthermore, multiple operations may occur at the same time or as an internal part of a larger process. In some embodiments, one or more of the operations of the method 200 described herein may not be performed. For example, as discussed above, in some embodiments of the present disclosure, the method 200 may be performed without the performance of operations 216, 224, and/or 240.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

Figure 3:
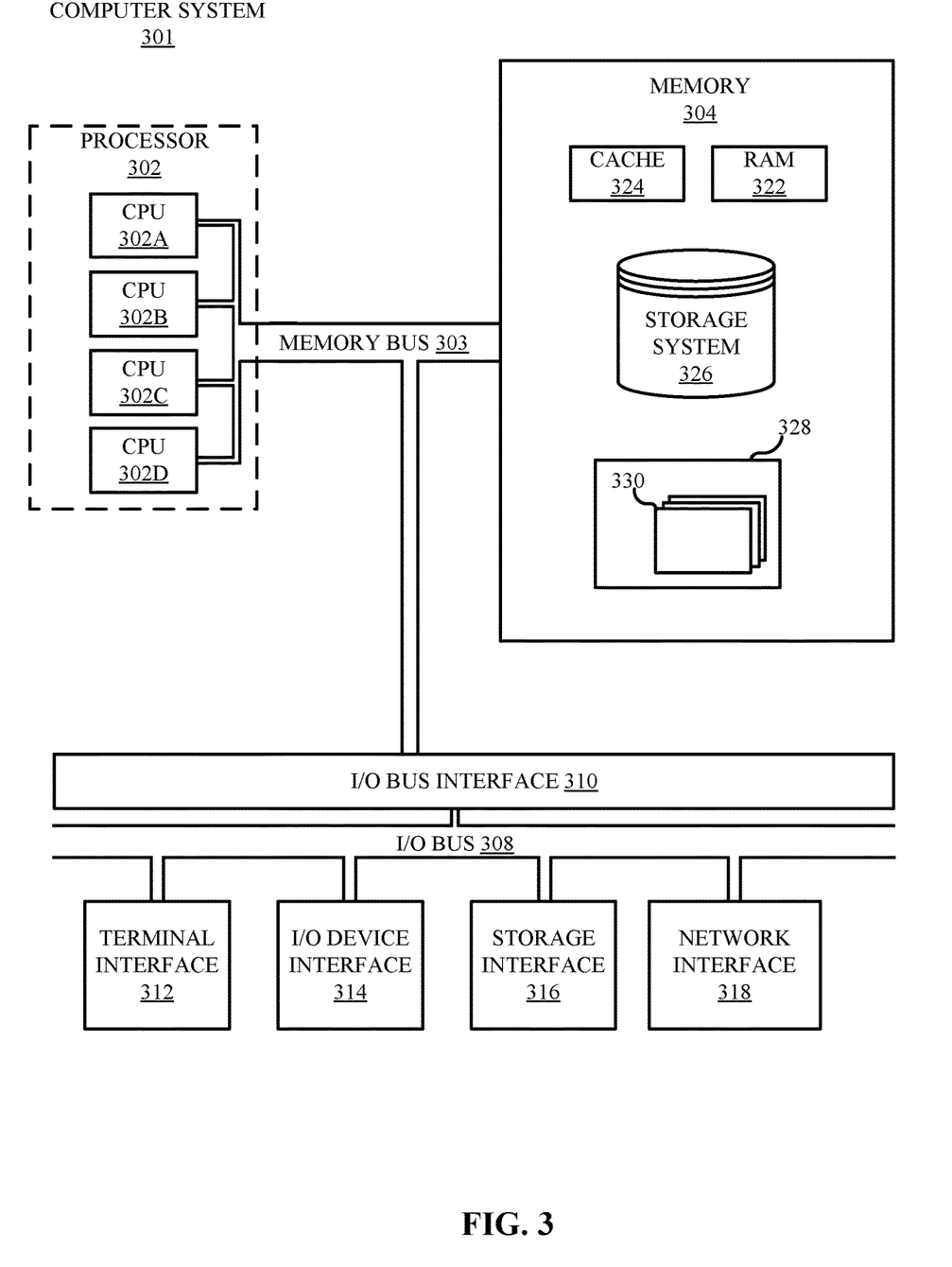
FIG. 3 illustrates a high-level block diagram of an example computer system that may be used in implementing one or more of the methods, tools, and modules, and any related functions, described herein, in accordance with embodiments of the present disclosure.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 330 generally perform the functions or methodologies of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
    receiving a first signal indicating that a first party in a call has temporarily left the call;
    indicating to a second party in the call that the first party in the call has temporarily left the call;
    receiving a recorded message from the second party in the call and an indication that the second party in the call has temporarily left the call;
    subsequent to receiving the recorded message from the second party in the call and the indication that the second party in the call has temporarily left the call, receiving a second signal indicating that the first party has returned to the call; and
    providing, subsequent to receiving the second signal, the recorded message to the first party.

2. The method of claim 1, wherein receiving the first signal indicates that the call has been placed in a queue.

3. The method of claim 2, wherein receiving the second signal indicates that the call has reached a first position in the queue.

4. The method of claim 1, further comprising:
    prompting, in response to providing the recorded message to the first party, the first party to select a response to be applied to the call.

5. The method of claim 4, wherein the response includes the first party remaining active in the call until the second party returns to the call.

6. The method of claim 4, wherein the response includes placing the second party in a queue.

7. The method of claim 1, further comprising:
    prompting the second party to provide the recorded message after receiving the first signal.

8. A computer program product comprising a computer readable storage medium having program instructions embodied therewith, the program instructions executable by a processor to cause the processor to perform a method comprising:
    receiving a first signal indicating that a first party in a call has temporarily left the call;
    indicating to a second party in the call that the first party in the call has temporarily left the call;
    receiving a recorded message from the second party in the call and an indication that the second party in the call has temporarily left the call;
    subsequent to receiving the recorded message from the second party in the call and the indication that the second party in the call has temporarily left the call, receiving a second signal indicating that the first party has returned to the call; and
    providing, subsequent to receiving the second signal, the recorded message to the first party.

9. The computer program product of claim 8, wherein receiving the first signal indicates that the call has been placed in a queue.

10. The computer program product of claim 9, wherein receiving the second signal indicates that the call has reached a first position in the queue.

11. The computer program product of claim 8, wherein the method further comprises:
    prompting, in response to providing the recorded message to the first party, the first party to select a response to be applied to the call.

12. The computer program product of claim 11, wherein the response includes the first party remaining active in the call until the second party returns to in the call.

13. The computer program product of claim 11, wherein the response includes placing the second party in a queue.

14. The computer program product of claim 8, wherein the method further comprises:
    prompting the second party to provide the recorded message after receiving the first signal.

15. A system for in-call messaging by performing a method, the method comprising:
    receiving a first signal indicating that a first party in a call has temporarily left the call;

indicating to a second party in the call that the first party in the call has temporarily left the call;

receiving a recorded message from the second party in the call and an indication that the second party in the call has temporarily left the call;

subsequent to receiving the recorded message from the second party in the call and the indication that the second party in the call has temporarily left the call, receiving a second signal indicating that the first party has returned to the call; and providing, subsequent to receiving the second signal, the recorded message to the first party.

16. The system of claim 15, wherein receiving the first signal indicates that the call has been placed in a queue.

17. The system of claim 16, wherein receiving the second signal indicates that the call has reached a first position in the queue.

18. The system of claim 15, wherein the method further comprises prompting, in response to providing the recorded message to the first party, the first party to select a response to be applied to the call.

19. The system of claim 18, wherein the response includes the first party remaining active in the call until the second party returns to the call.

20. The system of claim 18, wherein the response includes placing the second party in a queue.

* * * * *